United States Patent
Taylor et al.

(10) Patent No.: US 12,284,257 B2
(45) Date of Patent: Apr. 22, 2025

(54) SYSTEMS AND METHODS FOR DELIVERY OF CONTENT IN ASSOCIATION WITH NOTIFICATION MESSAGES

(71) Applicant: Pushnami LLC, Austin, TX (US)

(72) Inventors: Mitchell Taylor, Austin, TX (US); Emerson Smith, Austin, TX (US)

(73) Assignee: Pushnami LLC, Austin, TX (US)

( * ) Notice: Subject to any disclaimer, the term of this patent is extended or adjusted under 35 U.S.C. 154(b) by 0 days.

(21) Appl. No.: 18/524,220

(22) Filed: Nov. 30, 2023

(65) Prior Publication Data

US 2024/0187497 A1 Jun. 6, 2024

Related U.S. Application Data

(60) Provisional application No. 63/429,455, filed on Dec. 1, 2022.

(51) Int. Cl.
*H04L 67/55* (2022.01)

(52) U.S. Cl.
CPC .................................. *H04L 67/55* (2022.05)

(58) Field of Classification Search
CPC .......... H04L 67/55; H04L 67/30; H04L 67/52
See application file for complete search history.

(56) References Cited

U.S. PATENT DOCUMENTS

| | | | |
|---|---|---|---|
| 9,531,827 B1* | 12/2016 | Onnen | H04L 51/04 |
| 2017/0316463 A1* | 11/2017 | Pielot | H04W 52/0251 |
| 2018/0026920 A1* | 1/2018 | Chen | H04L 67/55 |
| | | | 455/466 |
| 2024/0155204 A1* | 5/2024 | Kuang | G06F 9/453 |

* cited by examiner

*Primary Examiner* — Benjamin M Thieu
(74) *Attorney, Agent, or Firm* — Sprinkle IP Law Group

(57) ABSTRACT

Notification systems and methods that combine the generation and delivery of notifications with the ability to dynamically select or render content for those notifications are disclosed. The selection of what content to include in such notifications, or the rendering of such content, may be performed at or after a time of the delivery of the notifications to users.

18 Claims, 4 Drawing Sheets

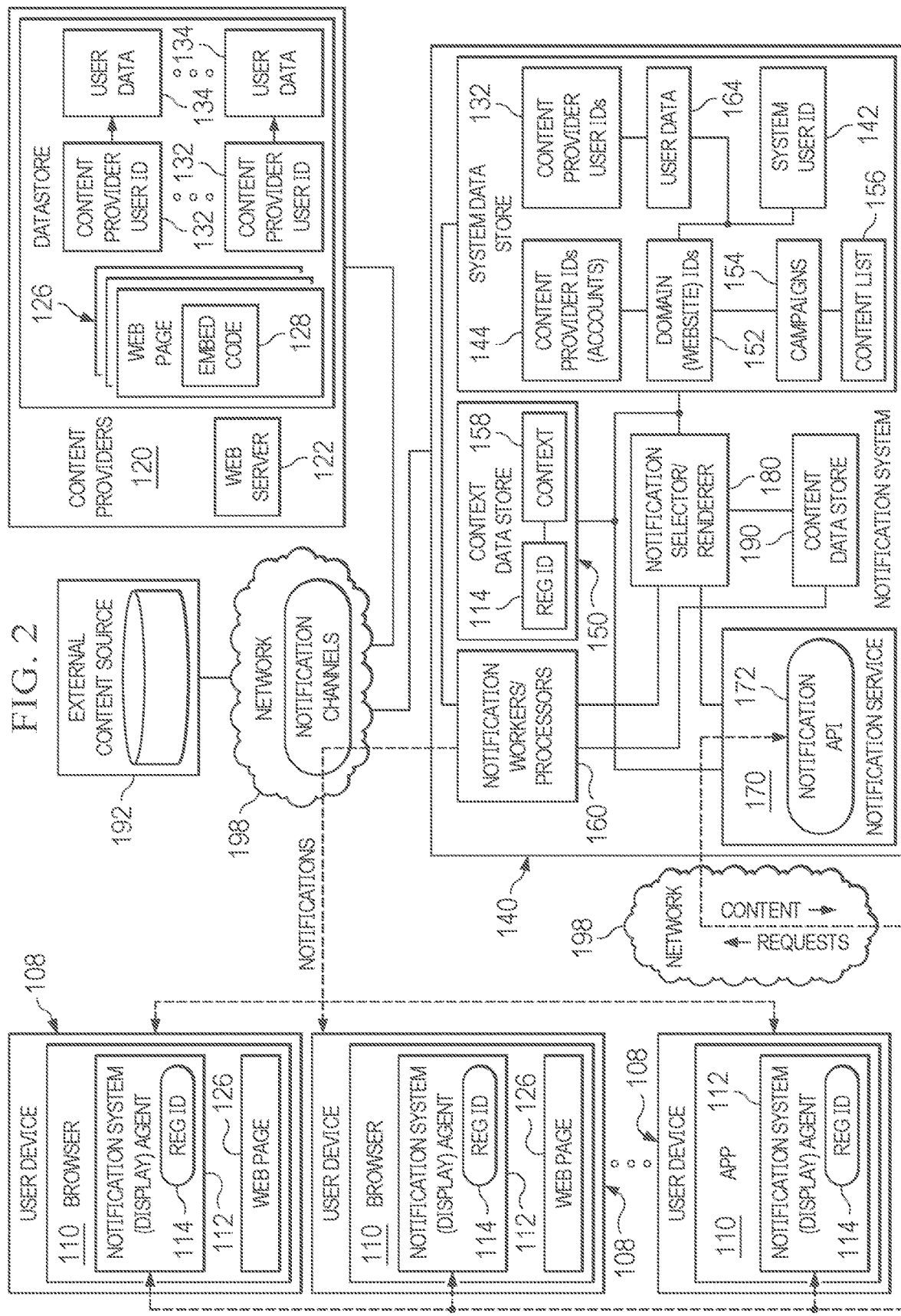

SYSTEMS AND METHODS FOR DELIVERY OF CONTENT IN ASSOCIATION WITH NOTIFICATION MESSAGES

RELATED APPLICATIONS

This application claims the benefit of priority under 35 U.S.C. § 119 to U.S. Provisional Application No. 63/429,455, entitled "SYSTEMS AND METHODS FOR DELIVERY OF CONTENT IN ASSOCIATION WITH NOTIFICATION MESSAGES", filed Dec. 1, 2022, which is hereby fully incorporated by reference herein for all purposes.

TECHNICAL FIELD

This disclosure relates generally to notification systems. In particular, this disclosure relates to the delivery of content in association with notifications in a high-volume notification system. Specifically, this disclosure relates to the delivery of content in association with online notifications to improve the determination or provisioning of appropriate content for such notifications, including after the delivery of such notifications to their destinations.

BACKGROUND

In an online environment it is desirable to contact users at various points. Notification systems may thus be provided to contact these users in the course of their online activity (e.g., by email, push notification, etc.). For example, based on a variety of criteria, notification systems may determine that notifications are to be sent to users. One or more notifications can then be generated for these users. The generation of these notifications may entail a number of actions, including obtaining content, rendering templates, etc. associated with the notification, and sending the notification through a delivery channel.

Traditionally, many notification systems experienced difficulty with effective notification based in no small part on the content that is included in such notifications. Specifically, various impediments to effective notification of users may arise from the need to select, obtain, or render content for such notifications.

What is desired, therefore, are improved systems and methods for dealing with the selection or provisioning of content in association with notifications to users in an online environment.

SUMMARY

As discussed, notification systems may be provided to contact users, including contacting these users based on their online activity (e.g., by email, push notification, etc. or other channels of communicating with a user, collectively referred to as notifications). Many notification systems are not capable of effective notification scheduling which may have certain advantages such as better control over rates and volume of the notifications being sent. One difficulty with implementing notification scheduling is the need to select, obtain or render content for such notifications at the time of sending (e.g., or prior to sending) such notifications.

For these reasons, among others, embodiments as disclosed may combine the generation and delivery of notifications with the ability to dynamically select or render content for those notifications, whereby the selection of what content to include in such notifications (e.g., or the rendering of such content) may be performed at (or after) the time of the delivery of the notifications to users. Specifically, embodiments may be capable of sending notifications over a notification channel. A display agent may be included at the user's device, where the display agent is adapted to process received notifications.

When it is determined that a notification is to be sent to a user, embodiments can determine that delayed content selection is to be employed for that notification and determine and store a context associated with the notification. The notification can then be sent to the user where the notification does not include content (e.g., any selected content) but includes an instruction intended to cause the display agent to request content for the notification. When the display agent encounters or determines such a content retrieval instruction the display agent may be adapted to request content for the notifications.

When this request for content is received from the display agent, content to return to the display agent for the notification may be selected. Specifically, the context associated with the notification may be obtained. The context data store and content for the notification selected are based on the stored context. The selected content can be returned to the display agent. The display agent, in turn, displays the received content in association with the notification.

In certain embodiments, a "kill switch" may be included which allows the notification system to throttle (or shut off temporarily) the smart delivery of content to, for example, provide a failsafe circuit breaker for fault tolerance or other reasons. Such a kill switch may facilitate the throttling or limiting the number of notifications for which content is selected or rendered over a certain time period or may allow the notification system to deal with a glut of received requests for content, including applying a predetermined approach.

Accordingly, embodiments may have several advantages, including the ability to select, render or present timely content at the time the notifications are delivered (e.g., viewed by, or presented to, a user) as opposed to a scheduled message whereby content is selected and rendered before delivery. As another advantage, the delivery and rendering of notifications may be implemented in a more efficient manner, as content is requested (e.g., and selected or rendered) for such notifications only when such content is actually required (e.g., only at the time the notification is delivered to a user).

Another significant advantage is that embodiments may improve efficiency by only rendering content for notifications that may actually be delivered (e.g., accessed, or seen by, a user). Thus, embodiments may provide the benefit that notifications can be scheduled and sent (e.g., on a recurring basis) at one time (to allow a place to be reserved or held in a notification channel) but that these same notifications can still include live or fresh content selected (e.g., and rendered) at a later time (e.g., the time of delivery of that notification). Such a capability is advantageous because push notifications may be (in some cases quite) delayed based on a number of factors (including those outside the control of the push notification system itself, such as network bandwidth problems, carrier issues, etc.).

Moreover, a push notification system can dynamically and selectively determine when to apply this type of delayed content delivery to an individual or a group of notification messages based on a wide variety of criteria. The application of this type of content delivery in a dynamic and selective manner can thus serve to alleviate throughput or load based issues encountered by notification systems, even when these issues arise from externally to such systems.

To elaborate in more detail, embodiments may allow better control over notification rate and volume such that notifications can be coordinated during transmission to meet internal or external requirements. Embodiments may also provide better targeting capability. Notifications can be scheduled only to an intended audience or only at intended times of a day through the use of context information stored in the context data store. In addition, transmission fault tolerance may be improved as embodiments of a notification system can allow for fault tolerance such as temporarily reduced throughput as controlled by the notification service.

In one embodiment, a notification system can comprise a processor and a non-transitory computer readable medium comprising instructions for: at a first time, determining a notification is to be sent to a user at a user device, determining smart delivery is to be used for the notification and storing a context for the notification. The stored context may be associated with an identifier (e.g., a registration identifier associated with a display agent). A notification adapted to cause a display agent executing on the user device to issue a request for content in association with the notification can be generated and sent to the user at the user device.

At a second time, embodiments of a notification system can receive a request for content from the display agent at the user device, wherein the request was sent by a display agent in response to receiving a notification and where the request includes the identifier associated with the context for the notification. In response to receiving the request for content, the notification system may obtain the context associated with the notification using the identifier included in the received request, select content for the notification based on the obtained context and return the content to the display agent in response to the request. The display agent is adapted to display the notification including the content in response to receiving the content for the notification.

In an embodiment, determining smart delivery is to be used for the notification comprises determining content for the notification and determining that smart delivery is to be used for the determined content based on a designation association with the selected content.

In some embodiments, an identification of determined content for the notification is included in the stored context for the notification. This identification may be, for example, a templated Uniform Resource Locator (URL).

In a particular embodiment, selecting content for the notification based on the obtained context comprises determining a content list or a content type from the context associated with the notification and selecting content based on the content list or content type.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 2 is a diagrammatic representation of an embodiment of a notification system adapted for smart delivery of content.

DETAILED DESCRIPTION

Figure 1A:
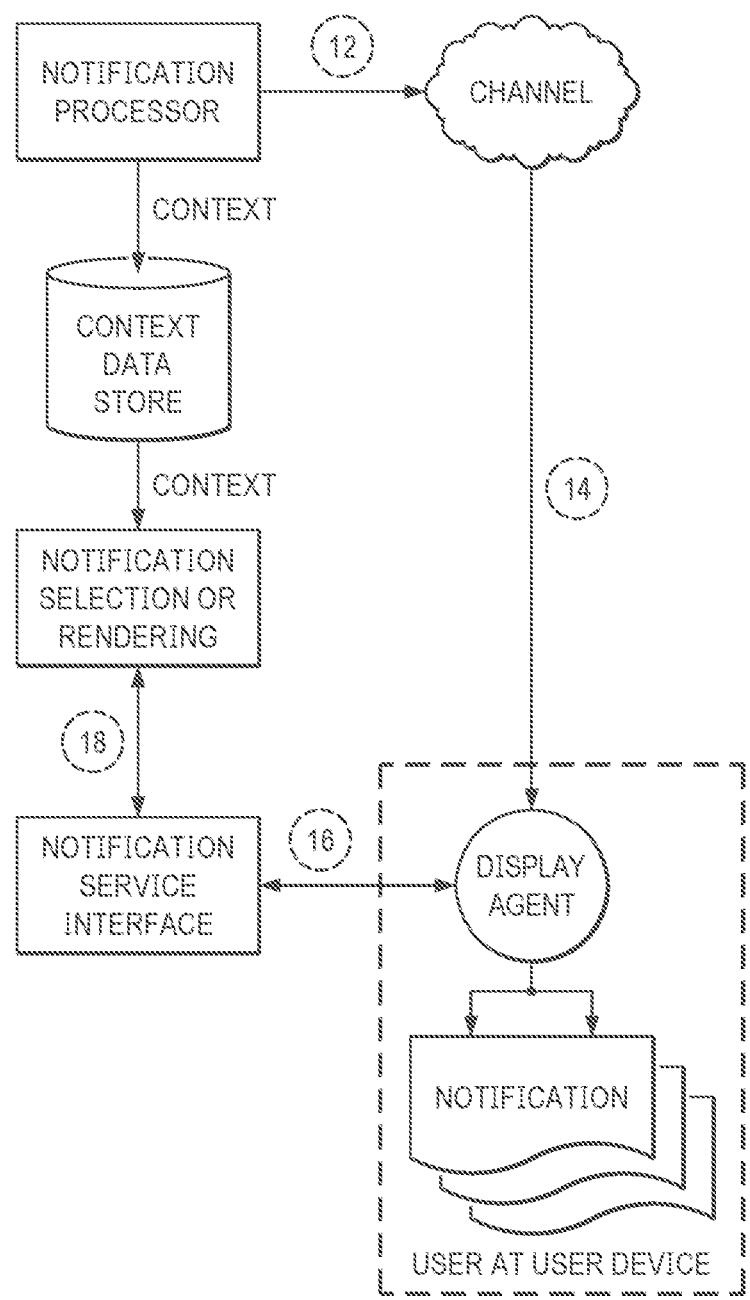
FIGS. 1A and 1B are diagrammatic representations including embodiments of notification systems adapted for smart delivery of content.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Before discussing embodiments in more detail a brief description of the context in which embodiments can be utilized may be helpful. Namely, digital notification systems. It will be noted, however, that while embodiments as described herein may be described in such a context, embodiments may be equally effectively employed in other contexts where messaging and queuing are utilized and all such embodiments are fully contemplated herein without loss of generality.

As may be realized, in the current online environment it is desirable to contact users at various points during the online activity. Certain notification systems may thus be provided to contact these users, including contacting these users based on their online activity (e.g., by email, push notification, etc. or other channels of communicating with a user, collectively referred to as notifications). For example, based on a variety of criteria, notification systems may determine that notifications are to be sent to users (e.g., in some cases subscribers or participating users who have indicated a receptiveness to such notifications). One or more notifications can then be generated for these users. The generation of these notifications may entail a number of actions associated with the notification (e.g., including obtaining content, rendering templates, etc.), and sending the notification through a delivery channel (or providing the notification to a service or other application for delivering the notification through the notification channel).

Traditionally, many notification systems were not capable of effective notification scheduling. For example, a traditional web ad unit is not capable of scheduling user notifications for a particular date or time. As another example, a traditional email service provider which requires specification of creative contents (e.g. a subject or message) prior to transmission may not be capable of effectively scheduling those emails or including the appropriate content.

The scheduling of notifications may have a number of advantages. Some of these advantages include control over notification rates and volumes (e.g., notifications can be coordinated during transmission to meet internal or external requirements); consumer targeting capabilities (e.g., notifications can be scheduled only to an intended audience); and transmission fault tolerance (e.g., a scheduling system for notifications can allow for fault tolerance such as temporarily reduced throughput).

An impediment to effective implementation of effective scheduling methodologies for notification systems is the need to select, obtain or render content for such notifications at the time of sending (e.g., or prior to sending) such notifications. There is, however, oftentimes a delay (sometimes significant) between when notifications are generated and when those notifications are received and viewed by (or otherwise delivered to) a user. The need to select, obtain or render content for notifications at the time of sending thus means that the content provided in such notifications may be "stale". For example, content for a notification may be selected during generation of that notification based on one set of criteria (e.g., what the user is viewing, etc.) when that criteria has been altered in some respect between the generation of that notification and the actual delivery of that notification to the user.

Moreover, oftentimes such content is never even delivered to a user (e.g., received, presented, displayed to the user or interacted with by the user). Because of quirks in notifications on certain devices (e.g., mobile devices) or the network or other channel over which those notifications are delivered, such notifications may not ever even be delivered to a user. Thus, the selection and inclusion of content in a generated notification (including the rendering of such content) at the time of generation of a notification may entail the user of computer resources and cycles that are completely wasted, as such a notification is never even delivered or viewed by a user.

Embodiments as disclosed may therefore combine the generation and delivery of notifications with the ability to dynamically select or render content for those notifications, whereby the selection of what content to include in such notifications (e.g., or the rendering of such content) may be performed at (or after) the time of the delivery (e.g., reception, presentation, displayed or interacted with by the user), of the notifications to users (referred to as "smart delivery" herein). Specifically, embodiments may include a notification processor (also referred to as a worker herein) capable of sending notifications over a notification channel. A display agent may be included with applications such as browsers or other applications on a user device, wherein the display agent is adapted to process received notifications through a particular channel. The display agent may be associated with the notification system and may also be associated with a registration identifier (e.g., which may be assigned or otherwise determined by the notification system or operators thereof).

The notification system may also include a notification interface provided by a notification service including a messaging Application Programming Interface (API) (or other type of interface such as a RESTful interface, etc.) through which requests for content can be received. When it is determined that a notification is to be sent to a user, the notification processor can determine that smart delivery is to be employed for that notification. Specifically, the notification processor can determine a context associated with the notification. This context may include data associated with content to be delivered in the notification, the user to whom the notification is to be delivered, or almost any other related data, such as a geographical segment, time, weather, etc. This notification processor may (or may not) also identify or otherwise select content for the notification at this point. For example the notification processor may interact with a notification selection and rendering service that may identify content to be presented in the notification for the user. Such content selection may be based on a wide variety of criteria as may be understood. This selected content may, for example, be associated with content that may be provided internally by the notification system or content that may necessitate retrieval or provisioning by an external content source. In some embodiments, if content is selected that is associated with an external data source, an identification of alternative internal content may also be returned for use in circumstances where the external content cannot be retrieved at the time a request is made for such content.

Thus, the notification processor can determine that smart delivery is to be employed for that notification based, for example, on the determined context, selected content (e.g., if it is being provided from external data source), or based on other criteria. A context determined by the notification processor in association with the generation of the notification may then be stored in a context data store. In particular, the context may be stored in association with the registration identifier for a display agent associated with a user (e.g., and a notification channel) for which the notification is intended. If content was selected for inclusion in the notification, an identification (e.g., an address, location, or other identifier) of such selected content may be included with (or in association with) the context stored in association with the registration identifier.

The notification processor then sends the notification over the notification channel, where the notification does not include content (e.g., any selected content) but includes an instruction intended for use by the display agent (e.g., at the user device for whom the notification is intended) to request content. In some embodiments, this instruction may be inferred by the display agent based on an absence of content in a received notification. For example, when the notification is empty the display agent may determine that content is to be requested.

When the display agent encounters or determines such a content retrieval instruction the display agent may be adapted to call the notification interface (e.g., API or RESTful service, etc.) associated with the notification service with a request for content. Accordingly, when notifications are delivered through the notification channel to the display agent the display agent makes a request for content through the notification interface of the notification service based on the instruction in the notification (e.g., a notification devoid of content or including a specific content request instruction). This request from the display agent may include the registration identifier of the display agent making the request for content.

When the notification service associated with the notification system receives this request for content from the display agent the notification service may determine content to return to the display agent. Specifically, the notification service may retrieve the context associated with the registration identifier in the context data store. If there is an identifier of previously selected content in the stored context associated with the registration identifier, the notification service may obtain this (e.g., previously selected) content. If the previously identified content is from an external data source, and the external content cannot be obtained from that external data source (e.g., the external data source returned an error, or the request times out, etc.), alternative internal content identified in the context data may instead be retrieved in cases where such alternative internal content is identified in the context.

Alternatively, if there is no identifier of previously selected content in the obtained context, the notification service may select the content at the time the request for content is received. For example, the notification service may interact with the notification selection and rendering service for selection of such content. In this case, the notification selection and rendering service may retrieve data for selecting content (e.g., user data, geography, templating data, etc.) and select content for inclusion in the notification. An identifier of the selected content can then be returned to the notification service.

In some embodiments, the notification service may render at least a portion of the content before sending the content to the requesting display agent. For example, the notification service may retrieve selected (or previously identified) content from an internal or external content source. This retrieved content may, for example, be (or include) a template. The notification service may populate at least a portion of this template (e.g., using context data associated with the registration identifier of the requesting display agent, user data associated with the user to whom the content is to be presented, or other data). The notification service can then return this rendered content to the display agent. The display agent, in turn, displays the received content in association with the notification.

In certain embodiments, a "kill switch" may be included which allows the notification service to throttle (or shut off temporarily) the smart delivery of content to, for example, provide a failsafe circuit breaker for fault tolerance or other reasons. Such a kill switch may facilitate the throttling or limiting the number of notifications for which content is selected or rendered over a certain time period or may allow the notification system to deal with a glut of received requests for content.

Accordingly, embodiments may have several advantages, including the ability to select, render or present timely content at the time the notifications are delivered (e.g., viewed by, or presented to, a user) as opposed to a scheduled message whereby content is selected and rendered before delivery. Similarly, smart delivery of these notifications may reduce the delay between content availability and engagement. As another advantage, the smart delivery of the content of these notifications may have more, and more rapid, engagement and feedback. For example, certain web content (e.g., an ad) may receive engagement (e.g., a click) within moments of rendering. Smart delivery may also facilitate the implementation of the delivery and rendering of notifications in a more efficient manner, as content is requested (e.g., and selected or rendered) for such notifications only when such content is actually required (e.g., only at the time the notification is delivered to a user). For example, a web advertisement unit may not request an advertisement creative from an external content provider until immediately before an ad impression.

Another significant advantage is that embodiments may improve efficiency by only rendering content for notifications that may actually be delivered (e.g., accessed, or seen by, a user). To illustrate in more detail, with some notification channels (e.g. web-push or email) delivery rate or access rate is often poor, so embodiments improve efficiency by rendering content only for those notifications that are delivered at the time of delivery. This saves computational resources (e.g., and also available content inventory) for notifications that are never received or displayed to a user.

Managing content inventory may also be improved allowing content selection algorithms (e.g., machine learning or the like) to better select content based on the confirmation that it will be displayed to the user.

Thus, embodiments may provide the benefit that notifications can be scheduled and sent (e.g., on a recurring basis) at one time (to allow a place to be reserved or held in a notification channel) but that these same notifications can still include live or fresh content selected (e.g., and rendered) at a later time (e.g., the time of delivery of that notification). Such a capability is advantageous because such push notifications may be (in some cases quite) delayed based on a number of factors (including those outside the control of the push notification system itself, such as network bandwidth problems, etc.). Moreover, a push notification system can dynamically and selectively determine when to apply smart delivery to an individual or a group of notification messages based on a wide variety of criteria, including for example, source or type of included content, intended recipient, desires of users or third party associated with the notifications, the load on the notification system, network load, feedback from external sources, or almost any criteria desired. The application of smart delivery in a dynamic and selective manner can thus serve to alleviate throughput or load based issues encountered by notification systems, even when these issues arise from externally to such systems.

To elaborate in more detail, embodiments may allow better control over notification rate and volume such that notifications can be coordinated during transmission to meet internal or external requirements. Embodiments may also provide better targeting capability. Notifications can be scheduled only to an intended audience through the use of context information stored in the context data store. In addition, transmission fault tolerance may be improved. The notification system can allow for fault tolerance such as temporarily reduced throughput as controlled by the notification service. Moreover, the presentation of timely content may be achieved. Content is retrieved immediately before display, allowing minimal time between content selection and display. Message efficiency is also improved. Notifications are retrieved from the (external or internal) content source(s) only immediately before display. For example, notifications are not generated which will not be delivered over the messaging channel. As another advantage, this delivery of content for notifications may be accomplished with increased security as it is not required to pass context or user data between display agents and the notification system.

Turning initially to FIG. 1A, the coordination of entities according to one embodiment of a notification system adapted for smart delivery of notifications is presented. In one embodiment of a notification system, a notification processor (worker) stores associated (notification) context for a notification intended for a user in a context data store, and transmits a notification (e.g., with an instruction) to a notification channel (STEP 12). The context for the notification may be stored in association with an identifier of a display agent at the user's user device or another type of identifier associated with the user or the user's device or display agent. The notification is delivered to the display agent at the user's device (STEP 14). Upon receiving the notification with the instruction (e.g., an explicit or inferred instruction), the display agent makes a request to the notification service interface associated with the notification system (STEP 16). This request may include the identifier of the display agent or the user at the user's device (or other type of identifier).

The notification service requests content (or the identification of such content) from a message selection or rendering service (STEP 18). The notification selection or rendering service selects content (or selects and renders the selected content) based on the context previously stored for that notification in the context data store and returns the content to the notification service (STEP 18) (e.g., an identifier for the content or the actual rendered content). The identification of the appropriate context may be based, for example, on the identifier of the display agent of the user (or other identifier) included in the request from the display agent. The notification service returns the received content (e.g., an identifier for the content or the actual rendered content) through the notification service interface to the display agent at the user's device (STEP 16) in response to the request for content received from the display agent. The display agent can then display the received content for the notification.

Figure 1B:
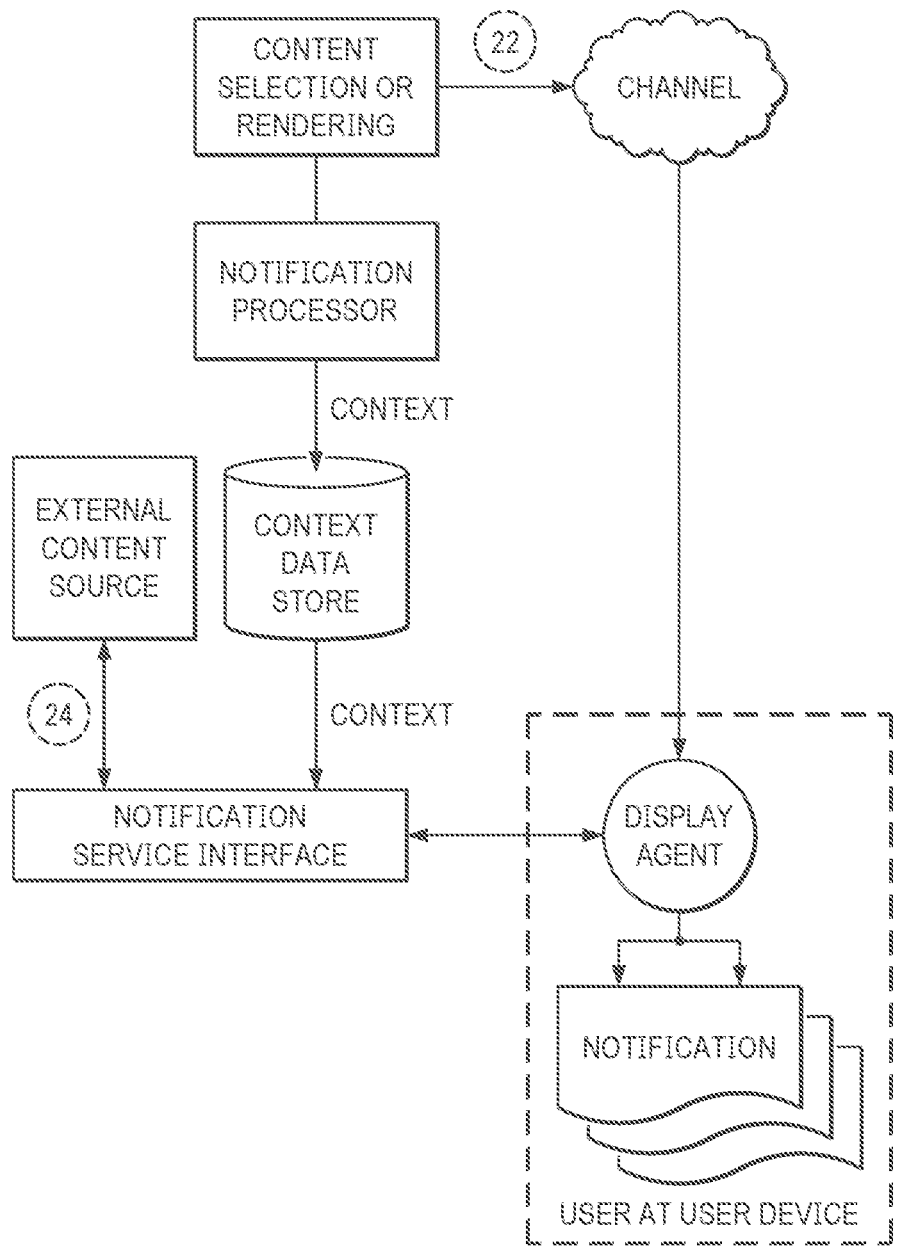

Referring now to FIG. 1B, the coordination of entities according to another embodiment of a notification system adapted for smart delivery of notifications is presented. Here, a notification processor (worker) generates a notification for a user requests content (or the identification of such content) from a notification selection or rendering service. The message selection or rendering service selects content and returns the content to the notification service (e.g., an identifier for the content or the actual rendered content). The notification processor may store context associated with the notification in a context data store. The context for the notification may include an identification of the content selected for the notification by notification selection or rendering service and may be stored in association with an identifier of a display agent at the user's user device or another type of identifier associated with the user or the user's device or display agent.

The notification processor transmits a notification (e.g., with an instruction) to a notification channel (STEP 22). The notification is delivered to the display agent at the user's device associated with the notification. Upon receiving the notification with the instruction (e.g., an explicit or inferred instruction), the display agent makes a request to the notification service interface associated with the notification system. The request may include the identification of the requesting display agent or associated user or user device. When the notification service receives the request from the display agent, the notification service may access the context associated with the notification (e.g., based on the identifier of the display agent of the user (or other identifier) included in the request from the display agent). Based on the context, the notification service may obtain and render the previously identified content. For example, in one case, the notification service may request content from an external data source and receive content from the external data source in response to the request (STEP 24). In one embodiment, for example, the context for the notification may include an identifier for previously selected content. In such a case, the content identified in the obtained context for the notification may be requested from an external content source (STEP 24). Alternatively, content selection criteria or an identifier associated with the user (e.g., as associated with the context for the notification) may be provided in the request to the external content source. The external content source can then select and render the selected content and return the selected and rendered content to the notification service. Once the notification service has such content, that content may be returned to the requesting display agent through the notification service interface. The display agent can then display the received content for the notification.

Moving on to FIG. 2, a diagram of an architecture of a distributed networked computing environment including an embodiment of a notification system adapted for smart delivery of content is presented. Notification system 140 is coupled to user devices 108 and content providers 120 over network 198. Network 198 may be the Internet, a wide area network (WAN), a local area network (LAN), an intranet, an internet, a wired network, a wireless network (including a cellular network), or some combination thereof.

Content provider 120 may be any for-profit or non-profit organization or entity (used herein interchangeably) that, as part of its operations, needs to conduct online activity. To facilitate interaction with users and conducting online activity with these users, the content providers 120 may include a web server 122 and one or more web pages 126 in an associated data store. These web pages 126 may, for example, be associated with one or more domains associated with the content provider 120. Users may access these web pages 126 through a browser 110 on user devices 108. These user devices 108 may be, for example, personal computers, laptop computers, mobile phones, watches or other wearables, or other data processing device, and may include a processor, a display (virtual or physical) and a user interface. Content providers 120 may also include other means of contacting users such as through a call center or other user touch points which may be online or offline.

Accordingly, content providers 120 may include user identifiers 132 (content provider user ids) associated with users who access their web sites or domains through web pages 126. Such a content provider user id 132 may be a unique value associated with the user such as an email or the like. For example, the content provider user id 132 may be a hash of a user's email (e.g., for security purposes) or other substantially unique identifier for a user. Moreover, a content provider 120 may have user data 134 associated with such a content provider user id 132. This data may be data collected on, or provided by, a user accessing web pages 126 of the content provider 120.

For example, a user may subscribe to notifications from a content provider 120. Such users may have opted into, or otherwise provided permission, to "subscribe" to receive notifications or other data from a content provider 120 (e.g., through the content provider 120 website 126 that they are accessing, or through another channel such as SMS, email, push notifications for an app, etc.). For example, a subscription can include a single messaging subscription which is generated when a user enables or allows notification permissions on a website. Content provider user ids 132 may be identifiers of users who have subscribed to receive notifications from the content provider 120.

Notification system 140 may thus be adapted to send such notifications to users who have subscribed to receive such notifications. Specifically, these notifications can be delivered (or initiated) by notification system 140 and those notifications delivered to the users at user devices 108 through one or more notification channels (e.g., through website 126, SMS, email, push notification, including a push notification for an application, or another type of notification channel). A notification channel can receive or deliver a notification (e.g., to a display agent 112 at the user device 108). Such a notification channel may include, for example, an email service provider, a push notification service, HTML embedded in a website, etc.

Thus, notification system 140 may store content provider identifiers (also referred to as an account or account identifier) 144 where each of those account identifiers 144 may be associated with, and identify, a content provider system 120 that desires to have notifications provided by the notification system 140 to their subscribers. Notification system 140 may also maintain a list of domains (or website) identifiers (IDs) 152 for content providers 120 (e.g., the domains or web pages provided by a content provider 120 may be associated with account identifier 144 for that particular content provider 120). These domain IDs 152 may identify domains or websites associated with web pages 126 provided by the content providers 120 and be associated with various information such as interests, verticals, demographic information, etc. associated with these domains.

Moreover, for each of the content providers 120, the notification system 140 may maintain content provider user ids 132 for users associated with that content provider 120 (e.g., users who access the web sites or domains of that content provider 120 through web pages 126 or who have subscribed to notifications from that content provider 120). These content provider user ids 132 may be associated with the content provider id 144 for that content provider 120.

One or more web pages 126 provided by the content provider organization 120 may include an embed code 128. This embed code 128 can cause the web browser 110, rendering the web page 126, to request a notification system agent from notification system 140 or another location (e.g., if the agent is not already present or executing on the user device 108). The embed code 128 may comprise a script tag, an include tag, or the like. The notification system agent 112 (also referred to as a display agent) may include code such as JavaScript or the like, which may be executed by the browser 110 at the user's device 108. A notification agent 112 may also be included in (e.g., embedded in) other applications (e.g., "apps") that are executed or installed on a user device 108 (e.g., a native application or the like).

In an embodiment, a notification agent may be part of, or include a program or script which executes on a website and is configured to generate and track a user device identifier that identifies one or more subscribers corresponding to a user device 108. The agent may create a unique user identifier associated with user device 108 or a user on the user device 108 that may be passed to notification system 140 and stored at notification system 140. In an embodiment, the notification system unique user device identifier 142 (SSUUID) (also referred to "notification system user device identifier" or "notification system user device identifier data") may be stored in association with an identifier 144 of a content provider system 120. Advantageously, following the generation of the SSUUID the online events by a user or user device 108 may be identified and tracked.

In one embodiment, the SSUUID 142 may be associated with a user who has opted into or otherwise provided permission to "subscribe" to receive notifications or other data from a content provider 120 (e.g., through the content provider 120 website 126 that they are accessing or through another channel). For example, a subscription can include a single messaging subscription which is generated when a user enables or allows notification permissions on a website. In an embodiment, the SSUUID 142 that is generated can be coupled with subscriber registration details to enable registration of the subscription such as a subscription endpoint, one or more encryption keys required for notification delivery, a subscription expiration time, etc. Thus, for example, a subscription may allow a push messaging system (e.g., associated with content provider 120) to send and deliver notifications to a user with such a subscription. Thus, this SSUUID 142 for a user may be stored at the notification system 140. Specifically, each of the SSUUIDs 142 for a user may be associated with a corresponding content provider user id 132 for each of the content providers 120 for which that user has subscribed to received notifications.

To generate such a SSUUID 142 for example, an agent may detect a set of idempotent functions invoked by a web browser 110 of a user device. The set of functions is used to generate an output or identifier specific to the user device's web browser state or configuration. Example functions include, but are not limited to, static details provided by the browser such as the useragent information, whether localStorage is enabled, rendering images using Canvas and WebGL which add more variation between devices depending on browser capabilities (e.g., available fonts), etc. In an embodiment, the agent or notification system 140 generates a final unique value based on the combination of the output of the functions identified in the collection phase. For example, the unique identifier may be generated by concatenating the output of these functions and providing the concatenated outputs as an input to a one-way hashing function. Advantageously, the functions executed on the user device are idempotent, such that the same results are produced by the web browser 110 throughout the session as well as across multiple sessions on different websites. The generation and use of such an identifier may also be understood with reference to U.S. Pat. No. 11,677,848 entitled "Subscription Management and Web-Based Activity Tracking in a Computing Environment" by inventors Smith and Taylor and issued on Jun. 13, 2023, which is incorporated herein by reference in its entirety for all purposes.

Accordingly, each of the content providers 120 may desire to have notifications provided to their subscribers (users) based on one or more campaigns 154 that they can define or otherwise specify. Each of the campaigns 154 may thus be associated with an identifier 144 of the content provider 120 that defined the campaign 154. The campaign 154 may also be associated with a particular website 152 of the identified content provider 144 such that notifications in association with the campaign 154 may only be sent to users who subscribed through, or who are otherwise associated with, the identified website 152. The campaign 154 may also specify one or more rules for generating notifications based on that campaign, including targeting rules defining interests or other attributes associated with the campaign 154, content rules or identification for content to be included such notifications, etc.

Specifically, in one embodiment each campaign 154 may be associated with content defined in one or more content lists 156 such that a set (or "bucket") of content is associated with the campaign 154. For example, the campaign 154 may be associated with an identifier for the content list 156. Each content list 156 or item of content defined in content list 156 may be associated with a content type. The set of content in content list 156 for a campaign may also be designated in various manners to indicate whether that content should be delivered in association with the campaign 154 using smart delivery or not. For example, an entire content list 156 may be designated as a smart delivery list (e.g., using a flag or the like), as expressly not a smart delivery list, or as a mixed list comprising content that should be delivered using smart delivery and content that should not be delivered using smart delivery. Each individual item of content in content list 156 associated with a campaign 154 may also be individually designated as smart delivery content (e.g. content that should be delivered using smart delivery) or as not smart delivery content. In this way, in certain cases a content list 156 associated with a campaign 154 may be designated as a (not) smart delivery list while individual content items included in that content list 156 may be designated as smart delivery content items (or vice versa).

The campaign 154 may also include restriction or timing rules on such as a (e.g., maximum) number of notifications that may be sent in a time period (or maximum number of notifications per user in a time period) that the content provider 120 desires, or any information the content provider 120 desires to be provided with a notification for the campaign 154. The campaign 154 may also include a specification of a delivery (or transport) notification channel through which they would like any notification associated with that campaign 154 to be provided. The campaigns 154 or associated content list 156 may be specified by a content provider 120 (e.g., a user associated with content provider 120) through an interface or through some other channel or mechanism provided by notification system 140 or operators of notification system.

Notification system 140 may thus provide notifications in association with campaigns 154 using notification processors (workers) 160. Specifically, notification processors 160 are adapted to generate the notification to the users. Accordingly, embodiments may include a notification processor (worker) 160 capable of sending notifications over a notification channel. The notification processor 160 may, for example, processes messages queued by a message scheduler and sends messages to a messaging channel. As an example, the notification processor 160 may be a cloud microservice which retrieves messages from a queue and calls a channel-specific messaging driver to send a notification.

A display agent 112 may be present on the user's device 108. This display agent 112 may be an application (e.g., an email application such as Outlook), a browser, a proprietary display agent associated with notification system 120 (e.g., a set of instructions being executed by a browser or otherwise on the user's device), or any other application adapted to process received notifications through a particular channel. In one embodiment, display agent 112 may be associated with the notification system 140 and may also be associated with a registration identifier 114 (e.g., which may be assigned or otherwise determined by the notification system 120 or operators thereof, or in another manner). Display agent 112 may be adapted for receiving a notification through a notification channel, coordinating with notification service 170 to obtain content, and displaying the obtained content in association with the notification. In some embodiments, for example, the display agent 112 may be included in a service worker which runs in (e.g., the background of) a user's browser.

Accordingly, the notification system 140 may also include a notification service 170 including a messaging API 172 (or other type of interface such as a RESTful interface or the like) through which requests for content can be received (e.g., from display agent 112). The notification service 170 and notification API 172 may coordinate with the notification selection and rendering service 180 and the display agent 112 to deliver notification content from the notification system 140 to the display agent 112 such that this content can be presented by the display agent 112 at the user device 108 in association with a notification.

To illustrate in more detail, notification processor 160 may determine that a notification is to be sent to a user in association with a campaign 154. When it is determined that a notification is to be sent to a user, the notification processor 160 can determine that smart delivery is to be employed for that notification (e.g., a subsequent decision regarding, or delivery of, content associated with that notification). The notification processor 160 can determine that smart delivery is to be employed for a notification based on a wide variety of criteria such as the determined context for the notification, the content list 156 associated with the campaign 154, the selected content for that notification (e.g., if it is being provided from external data source 192 smart delivery may be selected for the notification), or other criteria. Other embodiments may also determine if smart delivery is to be utilized in other manner. Such as by sending content via smart delivery for subscribers which have not had notifications delivered in some (e.g., configurable) time period or by sending smart delivery content alongside other content in a notification.

In one embodiment, the notification processor 160 can determine context 158 associated with the notification. This context 158 may include data associated with content to be delivered in the notification, the user to whom the notification is to be delivered (e.g. determined from user data 164), or almost any other related data, such as a geographical segment, time, weather, etc. This notification processor 160 may (or may not) also identify, or otherwise select content, for the notification at this point. The determination of the context 158 may be based on the content list 156 associated with campaign 154 for which the notification is being generated.

The determination of whether smart delivery is to be used and whether content is to be selected for the notification may thus be based on content list 156 associated with the campaign 154 for which the notification is being generated. For example, if the entire content list 156 for the campaign is designated as a smart delivery list it may be determined that smart delivery is to be used in association with the notification but that content selection will be delayed until a request for such content is received. In such circumstances, a content type or an identifier of content list 156 may be included in the context 158 associated with the notification without selecting a specific content item for the notification.

Similarly, in certain embodiments, a content list 156 for the campaign is designated as expressly not a smart delivery list, or as a mixed list. Thus, initially it may be determined that smart delivery has not been designated for the notification and a content item may be selected from the content list 156. If, in the course of selecting a specific content item within that content list 156, it is determined that the selected content item for the notification has been individually designated as a smart delivery content item, a determination that smart delivery is to be utilized can then be made (e.g., changed from the initial determination). As a specific content item has, at this point, been selected from content list 156 for the notification, an identification of the selected content item may be included in the context 158 for the notification.

For example, the notification processor 160 may interact with a notification selection and rendering service 180 that may identify content to be presented in the notification for the user. Such content selection by the notification selection and rendering service 180 may be based on a wide variety of criteria as may be understood. This selected content may, for example, be associated with content that may be provided internally by the notification system 140 (e.g., at least a portion of the content may be stored in content data store 190 associated with the notification system 140), or content that may necessitate retrieval or provisioning by an external content source 192 (such as an advertising network or the like). In some embodiments, if notification selection and rendering service 180 selects content that is associated with external data source 192, notification selection and rendering service 180 may also select alternative internal content from content data store 190 to return in circumstances where the external content cannot be obtained from external content source 192 at the time a request is made for such content.

The identification of such a selected content item can thus be included in the context 158 for the notification. In one embodiment, for example, the selected content item may be associated with a template. Context data 158 associated with the notification may be stored in association with an identification of a template for the selected content item such that the included data associated with the template in context data 158 may be used to generate content from that template at a later point (e.g., such that this data for populating the template may not have to be determined al such a later point). In particular, the notification service 170 may retrieve identified content from an internal content source 190 or external content source 192. This retrieved content may, for example, be (or include) a template. The notification service 170 may populate at least a portion of this template (e.g., using context data 158 associated with the registration identifier 114 of the requesting display agent 112, user data 164 associated with the user to whom the content is to be presented through a notification, or other data). In particular, an identifier for a selected content item comprising a template may include a Uniform Resource Locator or Identifier (URL or URI, URL collectively) that is an address associated with the template. This templated URL may be populated with context data 158 associated with the notification to generate a completed templated URL and this completed templated URL stored in context data 158 associated with the notification.

The context 158 determined by the notification processor may be stored in a context data store. In particular, the context 158 of the notification may be stored in association with the registration identifier 114 for a display agent 112 associated with a user (e.g., and a notification channel) for which the notification is intended. If content was not selected for inclusion in the notification an identifier of the content list 156 or a content type associated with the campaign 154 may be included in the context 158 along with other contextual data. If a specific content item was selected for inclusion in the notification by the notification selection and rendering service 180, an identification (e.g., an address, location, or other identifier in content data store 190 or at external data source 192) of such selected content may be included with (or in association with) the context 158 stored in association with the registration identifier along with other contextual data. Examples of contexts that may be determined or stored by particular embodiments are included in the Appendix below.

The notification processor 160 then sends the notification over the notification channel, where the notification that is sent does not include content (e.g., any selected content by notification selection and rendering service 180) but includes an instruction intended for use by the display agent 112 (e.g., at the application or user device 108 for whom the notification is intended) to request content. In some embodiments, this instruction may be inferred by the agent 112 in an absence of content in the notification. For example, the sent notification may be empty and upon determining a received notification is empty the display agent 112 may determine that content is to be requested.

When the display agent 112 encounters or determines such an instruction in a received notification, the display agent 112 may be adapted to call the notification API 172 of the notification service 170 with a request for content. Accordingly, when notifications are delivered through the notification channel to the display agent 112 the display agent 112 makes a request for content through the notification API 172 of the notification service 170 based on the instruction in the notification (e.g., a notification devoid of content or including a specific content request instruction). This request from the display agent 112 to the notification API 172 may include the registration identifier 114 of the display agent 112 making the request.

When the notification service 170 receives this request for content from the display agent 112 through the notification API 172, the notification service 170 may determine content to return to the requesting display agent 112. Specifically, the notification service 170 may retrieve the context 158 associated with the registration identifier 114 of the requesting display agent 112 in the context data store 150. If there is an identifier of previously selected content in the stored context 158 associated with the registration identifier 114 (e.g., a completed templated URL), the notification service 170 may obtain this (e.g., previously selected) content (e.g., or the stored identifier for the previously selected content). If the previously identified content (identified in the context 158) is from an external data source 192 it can be retrieved from the external content source 192 by the notification service 170 (e.g., using the completed templated URL). In some embodiments, if external content identified in the context 158 cannot be obtained from that external data source 192, if alternative internal content is identified in the context 158 this alternative internal content may instead be retrieved by notification service 170.

Alternatively, if there is no identifier of previously selected content in the obtained context 158, the notification service 170 may select the content at the time the request for content is received from the display agent 112 at the notification service 170 (or subsequently). For example, the notification service 170 may interact with the notification selection and rendering service 180 for selection of such content (e.g., by sending a request for content with the registration identifier of the display agent 112 from which the request for content was received or context data 158 such as a type of content or identifier of content list 156 associated with a campaign 154). In this case, the notification selection and rendering service 180 may retrieve data for selecting content (e.g., user data, geography, templating data, etc.) and select content for inclusion in the notification at the user device 108. An identifier of the selected content can then be returned from the notification selection and rendering service 180 to the notification service 170.

The notification service 170 can then retrieve the content identified by the notification selection and rendering service 180 and return the retrieved content to the requesting display agent 112. Display agent 112 can then present the received content in association with the received notification at the user device 108. In some embodiments, the notification service 170 may render at least a portion of the retrieved content before sending the content to the requesting display agent. For example, the notification service 170 may retrieve identified content from an internal content source 190 or external content source 192. This retrieved content may, for example, be (or include) a template. The notification service 170 may populate at least a portion of this template (e.g., using context data 158 associated with the registration identifier 114 of the requesting display agent 112, user data

164 associated with the user to whom the content is to be presented through a notification, or other data). The notification service 170 can then return this rendered content to the display agent that displays this content in association with the notification.

As may be realized then, by selecting or rendering content only at the moment when a notification has been delivered and is being presented to a user, embodiments may entail use of computing or other resources only at the time when it is virtually certain the user is viewing or being presented with a notification (e.g., as requests for such content may only be sent by display agent 112 at the point the display agent 112 is presenting the notification to the user). In this manner, resources (computer resources or monetary resources involved with the sending of data through notification channels) may not be utilized unless and until it is known that a notification is actually being viewed or delivered to a user. For substantially the same reasons, then, it is virtually guaranteed that the content selected or rendered by the notification system for the notification at the time of the request will be seen by a user, making the use of embodiments of the notification system much more desirable to utilize in the provisioning of content, as parties involved in the provisioning of content may be assured that such content may actually be seen. As an additional benefit to the use of embodiments of notification systems as disclosed, occurrences taking place between the generation of the notification and the delivery and presentation of content to the user in association with the notification may be accounted for when selecting or rendering content for such a notification. Thus, content viewed or delivered (e.g., by or to the user or by or to others) between the generation of the notification for a user and the selection of content may be accounted for in the selection of content for that user.

Figure 3:
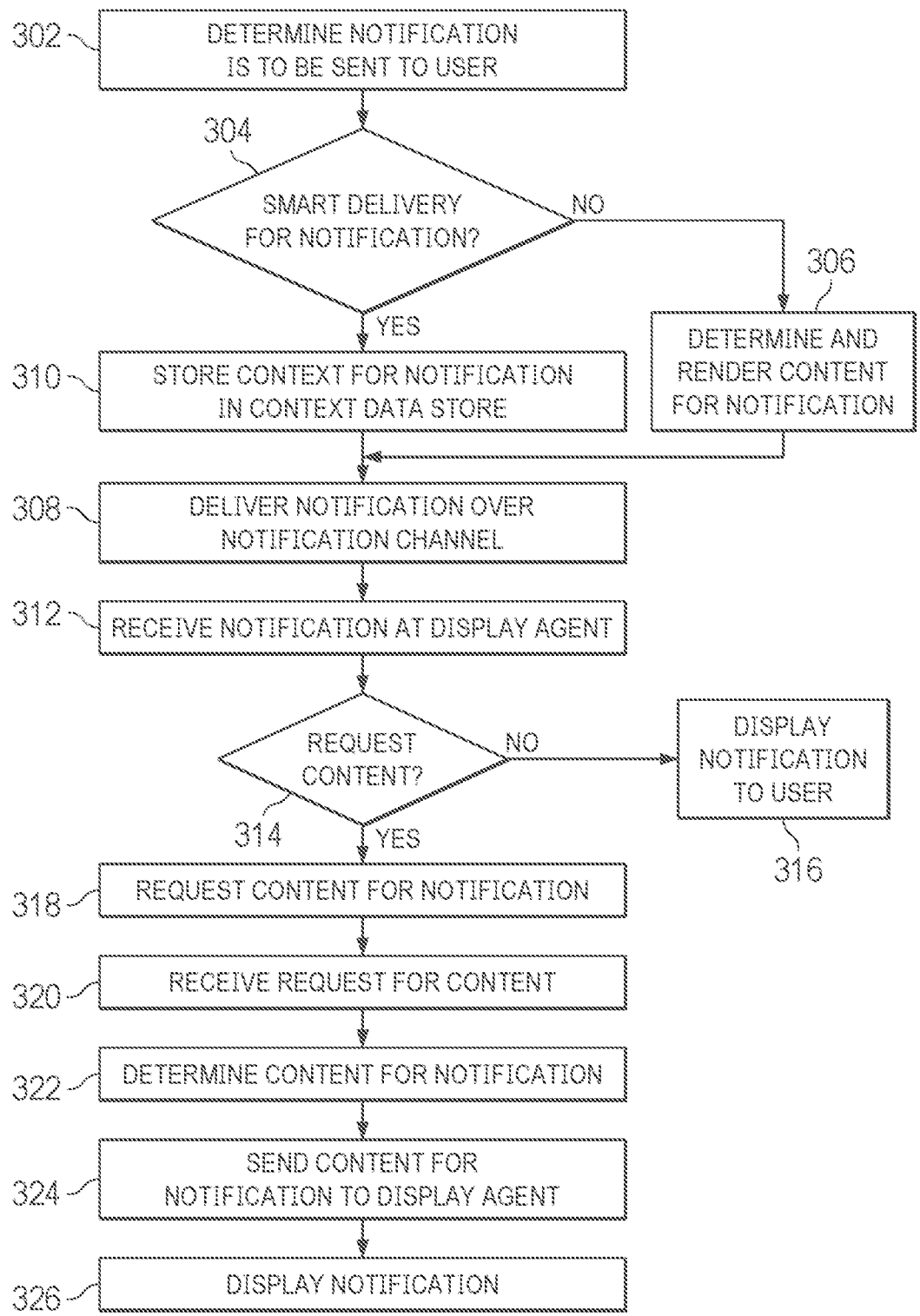
FIG. 3 is a flow diagram of one embodiment of a method for smart delivery of content for notifications.

Looking now at FIG. 3, a flow diagram of one embodiment of a method for content delivery in a notification system is depicted. Initially, a notification system can determine that a notification is to be sent to a user (STEP 302). Such a notification may be sent to a user in association with a campaign. When it is determined that a notification is to be sent to a user it can be determined whether smart delivery is to be employed tor that notification (STEP 304). If a determination is made that smart delivery will not be employed for the notification (No Branch of STEP 304), content may be selected for the notification (e.g., if not already selected in the course of determining whether smart delivery is to be utilized for the notification), and this selected content rendered for the notification (STEP 306). The notification may then be generated to include this selected and rendered content and the notification including the rendered content delivered to the user over a notification channel (STEP 308).

Conversely, if it is determined that smart delivery is to be employed for that notification (Yes Branch of STEP 304), a context for that notification may be stored (STEP 310). The context of the notification may be stored in association with a registration identifier for a display agent associated with the user or user's device (e.g., and a notification channel) for which the notification is intended. Il content was not selected for inclusion in the notification an identifier of the content list or a content type associated with the campaign may be included in the context stored for the notification along with other contextual data. If a specific content item was selected for inclusion in the notification an identification (e.g., an address, location, or other identifier in a content data store or at external data source) of such selected content may be included with (or in association with) the stored context for the notification along with other contextual data.

To elaborate in more detail, the determination of whether smart delivery is to be utilized for a notification can be based on a wide variety of criteria such as determined context data for the notification, a content list defining content that may be delivered for a notification in association with the campaign, actually selected content for that notification, criteria associated with how many, or what type of, notifications or content have been delivered in a particular time period (e.g., to that user or other users), or almost any other criteria desired.

In one embodiment, for example, the determination of whether smart delivery is to be used for the notification may be based on a content list defining content that may be sent in a notification for the campaign. Such a content list may be designated as a smart delivery list, not a smart delivery list, or a mixed list, while individual content items within a content list may also be designated as smart delivery (or not smart delivery). Thus, according to one particular implementation, if the entire content list for the campaign is designated as a smart delivery list it may be determined that smart delivery is to be used in association with the notification (Yes Branch of STEP 304). In such circumstances, a content type or identifier of a content list for the campaign may be included in the stored context associated with the notification without selecting a specific content item for the notification (STEP 310).

Similarly, in certain embodiments, if a content list for the campaign is designated expressly as not a smart delivery list, or as a mixed list, content may be selected from the content list for use with the notification. If, after selecting a specific content item within that content list, it is determined that the selected content item for the notification has been individually designated as a smart delivery content item, a determination that smart delivery is to be utilized can then be made (Yes Branch of STEP 304). As a specific content item has, at this point, been selected from the content list for the notification, an identification of the selected content item may be included in the stored context for the notification (STEP 310). In some embodiments, the selected content is associated with an external data source, alternative content may be selected to return (e.g., if the selected content cannot be obtained from external content source at the time a request is made for such content). An identifier of this alternative content may also be stored in the context for the notification (STEP 310).

A notification can then be sent over a notification channel (STEP 308). In the case where it is determined that smart delivery is to be employed for the notification, the notification that is sent does not include content (e.g., does not include any content from the content list associated with the campaign for which the notification is being sent), but instead includes an instruction adapted to cause a display agent (e.g., at the application or user device for whom the notification is intended) to request such content. In some embodiments, the notification may not include data comprising this instruction and the instruction may be inferred based on an absence of content in the notification. For example, the sent notification may be empty and upon determining a received notification is empty the receiving display agent may determine that content is to be requested.

This notification can then be received at a display agent on the user's device (STEP 312). The display agent can (e.g., in the course of presenting the notification to a user) make a determination whether to request content in association with that notification (e.g., a determination whether smart delivery is being employed for that notification) (STEP 314). If content is included in the notification, or there is not an instruction to request content for the notification (e.g., an instruction to request content is neither expressly included nor inferred from the notification) (No Branch of STEP 314), the display agent may display the received notification (e.g., with included content) to the user (STEP 316).

Alternatively, when the display agent encounters (or determines from lack of included content) a content request instruction from a received notification (Yes Branch of STEP 314), the display agent may request content from the notification system (e.g., by calling a notification API of the notification system with a request for content) (STEP 318). Accordingly, when notifications using smart delivery are delivered to the display agent at the user device, the display agent makes a request for content based on the instruction in the notification. This content request from the display agent may include the registration identifier of the display agent making the request.

This request for content may be received from the display agent (e.g., at the notification system) (STEP 320). Content to return to the requesting display agent for the notification can then be determined (STEP 322). Specifically, the context associated with the registration identifier of the requesting display agent may be obtained. If there is an identifier of previously selected content in the stored context associated with the registration identifier (e.g., an address or identifier of content such as a completed templated URL), this (e.g., previously selected) content may be obtained. If this previously identified content is associated with an external data source it can be retrieved from the external content source (e.g., using a completed templated URL). In some embodiments, if external content identified in the context cannot be obtained from that external data source, alternative content identified in the context may instead be retrieved.

Alternatively, if there is no identifier of previously selected content in the obtained context, content for the notification may be selected at the time the request for content is received from the display agent (or subsequently) using content selection data. This content selection data can include, for example, context data included in the obtained context associated with the registration identifier for the display agent (e.g., including an identifier of a content list or a content type), other data associated with a user or device associated with the registration identifier, or other data. The selected content can then be obtained (e.g., or rendered) and sent to the requesting display agent (e.g., in response to the request received from the display agent) (STEP 324). When that content for the notification is received at the display agent it can then be presented in association with the notification at the user device (STEP 326).

The invention and the various features and advantageous details thereof are explained fully with reference to the nonlimiting embodiments that are illustrated in the accompanying drawings and detailed in the description as included. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such an embodiment, feature, or function). Rather, the description is intended to describe illustrative embodiments, features, and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Reference throughout this specification to "one embodiment," "an embodiment," or "a specific embodiment," "a specific implementation," or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Data may be stored in a single storage medium or distributed through multiple storage mediums, and may reside in a single database or multiple databases (or other data storage techniques.

A "computer-readable medium" may be any medium that can contain, store, communicate, propagate, or transport the program for use by or in connection with the instruction execution system, apparatus, system or device. The computer readable medium can be, by way of example, only but not by limitation, an electronic, magnetic, optical, electromagnetic, infrared, or semiconductor system, apparatus, system, device, propagation medium, or computer memory. Such a computer-readable medium shall generally be machine readable and include software programming or code that can be human readable (e.g., source code) or machine readable (e.g., object code).

Furthermore, the term "or" as used herein is generally intended to mean "and/or" unless otherwise indicated. As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

APPENDIX

```
key -
pushnami:no-key-push-data:https://pushservice/endpoint
Example value that may be retrieved from a context store:
{
   "title": "Severe Weather Warning!", // a fallback title in case the external request fails
   "message": "Attention! A severe thunderstorm is approaching your area. Expect heavy rains and strong winds. Please stay indoors and avoid travel.",
   "url": www.weatheralerts.com/severe-storm, // a fallback message in case the external request fails
   "campaignId": "655701600000000000000004", // identifier for the campaign
   "icon": "/api/push/icon/655701600000000000000003", // a fallback icon in case the external request fails
   "tag": "message-tag", // a tag used for delivery
   "s": "655701600000000000000002", // identifier for tracking the subscriber
   "channel": "webpush", // notification delivery channel
   "category": "weather",
   "flags": {}, // optional flags
   "mIver": 5, // versioning information
   "ttl": {
      "enabled": false
   },
   "collection": "655701600000000000000000", // the identifier of the collection of notifications to select from
   "fallbackOnError": true,
   "buttons": [
      {
         "text": "Learn More",
         "link": ""
      }
   ],
   // Context information for use on delivery
   "liveContext": {
      "params": {
         "segmentApiKey": "655701600000000000000000",
         "apiKeyFallback": "655701600000000000000001"
      },
      "payload": {
         // geo data
         "dcountry": "US",
         "dstate": "TX",
         "dcity": "Austin",
         "dzip": "78704",
         // subscriber information
         "sdate": "2023-08-01T04:41:47.705Z", // subscription date
         "dip": "111.11.111.11",
         "pswebsite": https://www.weatheralerts.com,
         "subscriberId": "655701600000000000000002",
         "pcid": "655701600000000000000003",
         "useragent": "Mozilla/5.0 (Windows NT 10.0; Win64; x64) AppleWebKit/537.36 (KHTML, like Gecko) Chrome/119.0.0.0 Safari/537.36",
         "ddevice": "desktop",
         "dbrowser": "Google Chrome",
         "dbrowserversion": "119",
         "global_id": "0be097ac-24a2-4256-9991-cd03de2b0ec4",
         // tracking information used for templating
         "utm_source": "abc",
         "utm_medium": www.examplesource.com,
         "utm_campaign": "example-campaign",
         "vertical": "weather",
         // metadata
         "campaignType": "scheduled",
         "test_category": 1,
         "global_test_category": 55,
```

```
        "website": {
          "fullsite": https://www.weatheralerts.com,
          "ltag": "weatheralerts.com",
          "tag": "weatheralerts",
          "vert": "weather",
          "publisher_id": "12345"
        }
      }
    }
  }
}
```
Another example of a context where content associated with this context may be retrieved directly from an (e.g., external) data source using templating:
```
{
  "title": "Severe Weather Warning!", // a fallback title in case the external request fails
  "message": "Attention! A severe thunderstorm is approaching your area. Expect heavy rains and strong winds. Please stay indoors and avoid travel.",
  "url": www.weatheralerts.com/severe-storm, // a fallback message in case the external request fails
  "campaignId": "655701600000000000000004", // identifier for the campaign
  "icon": "/api/push/icon/655701600000000000000003", // a fallback icon in case the external request fails
  "tag": "message-tag", // a tag used for delivery
  "s": "655701600000000000000002", // identifier for tracking the subscriber
  "channel": "webpush", // notification delivery channel
  "category": "weather",
  "flags": { }, // optional flags
  "mIver": 5, // versioning information
  "ttl": {
    "enabled": false
  },
  "collection": "655701600000000000000000", // the identifier of the collection of notifications to select from
  "fallbackOnError": true,
  "buttons": [
    {
      "text": "Learn More",
      "link": ""
    }
  ],
  // Templated external url including context parameters
  "liveExternal":
https://externalprovider.com/?city=Austin&state=TX&useragent=Mozilla%2F5.0%20%28Windows%20NT%2010.0%3B%20Win64%3B%20x64%29%20AppleWebKit%2F537.36%20%28KHTML%2C%20like%20Gecko%29%20Chrome%2F119.0.0.0%20Safari%2F537.36&device=desktop&utm_source=abc&utm_medium=www.examplesource.com&utm_campaign=example-campaign&vertical=weather,
  // fallback and tracking metadata
  "liveExternalFallback": {
    "tags": {
      "version": "5",
      "randomizer": false,
      "segment": "655701600000000000000000",
      "creative": 0,
      "global_id": "0be097ac-24a2-4256-9991-cd03de2b0ec4"
    },
    "external":
https://alternateexternalprovider.com/?city=Austin&state=TX&useragent=Mozilla%2F5.0%20%28Windows%20NT%2010.0%3B%20Win64%3B%20x64%29%20AppleWebKit%2F537.36%20%28KHTML%2C%20like%20Gecko%29%20Chrome%2F119.0.0.0%20Safari%2F537.36&device=desktop&utm_source=abc&utm_medium=www.examplesource.com&utm_campaign=example-campaign&vertical=weather,
    "title": "Weather Warning",
    "message": "Learn more",
    "url": www.weatheralerts.com/severe-storm,
    "icon": "/api/push/icon/655701600000000000000003",
    "buttons": [
      {
        "text": "Click here",
        "link": ""
      }
    ]
  },
  "sendIndex": 0,
  "campaignSendId": "6557f337eaf8c200133fcd00_wIM4Cp1",
  "delaySeconds": 150
}
```

What is claimed is:

1. A notification system, comprising:
   a processor; and
   a non-transitory computer readable medium comprising instructions for:
   at a first time:
   determining a notification is to be sent to a user at a user device;
   determining smart delivery is to be used for the notification;
   storing a context for the notification, the context associated with an identifier;
   generating the notification, wherein the notification is adapted to cause a display agent executing on the user device to issue a request for content in association with the notification; and
   sending the notification to the user at the user device; and
   at a second time:
   receiving the request for content from the display agent at the user device, wherein the request was sent by the display agent in response to receiving the notification and include the identifier associated with the context for the notification;
   in response to receiving the request for content:
   obtaining the context associated with the notification using the identifier included in the received request;
   selecting content for the notification based on the obtained context; and
   returning the content to the display agent in response to the request, wherein the display agent is adapted to display the notification including the content in response to receiving the content for the notification.

2. The system of claim 1, wherein determining smart delivery is to be used for the notification comprises determining content for the notification, and determining that smart delivery is to be used for the determined content based on a designation association with the selected content.

3. The system of claim 2, wherein an identification of the determined content for the notification is included in the stored context for the notification.

4. The system of claim 3, wherein the identification of the selected content is a templated Uniform Resource Locator (URL).

5. The system of claim 1, wherein selecting content for the notification based on the obtained context comprises determining a content list or a content type from the context associated with the notification and selecting content based on the content list or content type.

6. The system of claim 1, wherein the identifier is a registration identifier associated with the display agent executing on the user device.

7. A method, comprising:
   at a first time:
   determining a notification is to be sent to a user at a user device;
   determining smart delivery is to be used for the notification;
   storing a context for the notification, the context associated with an identifier;
   generating the notification, wherein the notification is adapted to cause a display agent executing on the user device to issue a request for content in association with the notification; and
   sending the notification to the user at the user device; and
   at a second time:
   receiving the request for content from the display agent at the user device, wherein the request was sent by the display agent in response to receiving the notification and include the identifier associated with the context for the notification;
   in response to receiving the request for content:
   obtaining the context associated with the notification using the identifier included in the received request;
   selecting content for the notification based on the obtained context; and
   returning the content to the display agent in response to the request, wherein the display agent is adapted to display the notification including the content in response to receiving the content for the notification.

8. The method of claim 7, wherein determining smart delivery is to be used for the notification comprises determining content for the notification, and determining that smart delivery is to be used for the determined content based on a designation association with the selected content.

9. The method of claim 8, wherein an identification of the determined content for the notification is included in the stored context for the notification.

10. The method of claim 9, wherein the identification of the selected content is a templated Uniform Resource Locator (URL).

11. The method of claim 7, wherein selecting content for the notification based on the obtained context comprises determining a content list or a content type from the context associated with the notification and selecting content based on the content list or content type.

12. The method of claim 7, wherein the identifier is a registration identifier associated with the display agent executing on the user device.

13. A non-transitory computer readable medium, comprising instructions for:
   at a first time:
   determining a notification is to be sent to a user at a user device;
   determining smart delivery is to be used for the notification;
   storing a context for the notification, the context associated with an identifier;
   generating the notification, wherein the notification is adapted to cause a display agent executing on the user device to issue a request for content in association with the notification; and
   sending the notification to the user at the user device; and
   at a second time:
   receiving the request for content from the display agent at the user device, wherein the request was sent by the display agent in response to receiving the notification and include the identifier associated with the context for the notification;
   in response to receiving the request for content:
   obtaining the context associated with the notification using the identifier included in the received request;
   selecting content for the notification based on the obtained context; and
   returning the content to the display agent in response to the request, wherein the display agent is adapted to display the notification including the content in response to receiving the content for the notification.

14. The non-transitory computer readable medium of claim 13, wherein determining smart delivery is to be used for the notification comprises determining content for the notification, and determining that smart delivery is to be used for the determined content based on a designation association with the selected content.

15. The non-transitory computer readable medium of claim 14, wherein an identification of the determined content for the notification is included in the stored context for the notification.

16. The non-transitory computer readable medium of claim 15, wherein the identification of the selected content is a templated Uniform Resource Locator (URL).

17. The non-transitory computer readable medium of claim 13, wherein selecting content for the notification based on the obtained context comprises determining a content list or a content type from the context associated with the notification and selecting content based on the content list or content type.

18. The non-transitory computer readable medium of claim 13, wherein the identifier is a registration identifier associated with the display agent executing on the user device.

\* \* \* \* \*